United States Patent [19]

Tubbs

[11] Patent Number: 4,478,765

[45] Date of Patent: Oct. 23, 1984

[54] APPARATUS FOR AERATING WATER SUPPLIES

[76] Inventor: Dean L. Tubbs, P.O. Box 116, Appleton, Minn. 56208

[21] Appl. No.: 409,062

[22] Filed: Aug. 18, 1982

[51] Int. Cl.³ .............................................. B01F 3/04
[52] U.S. Cl. ...................................... 261/76; 138/44; 210/170; 261/DIG. 75
[58] Field of Search ................ 261/76, 121 R, 121 M, 261/DIG. 75; 210/169, 220, 221.2, 170; 138/40, 42, 44; 43/56, 57

[56] References Cited

U.S. PATENT DOCUMENTS

| | | | |
|---|---|---|---|
| 2,694,296 | 11/1954 | Prosek et al. | 138/44 X |
| 3,003,325 | 10/1961 | Poethig et al. | 261/76 X |
| 3,265,370 | 8/1966 | Scholten | 261/3 |
| 3,295,326 | 1/1967 | White | 261/76 |
| 3,664,818 | 5/1972 | Kramer | 261/76 X |
| 3,920,552 | 11/1975 | Elkern | 210/220 X |
| 4,072,612 | 2/1978 | Daniel | 210/169 |
| 4,157,304 | 6/1979 | Molvar | 261/76 X |
| 4,271,099 | 6/1981 | Kukla | 261/76 |
| 4,274,959 | 6/1981 | Roediger | 210/221.2 |

OTHER PUBLICATIONS

Hawley; *The Condensed Chemical Dictionary*, 8th Ed., Reinhold Co.; pp. 786–788, Sep. 4, 1974.

*Primary Examiner*—Richard L. Chiesa
*Attorney, Agent, or Firm*—Kinney & Lange

[57] ABSTRACT

An apparatus for aerating well water in a home water system includes a pressure tank situated above the water in the ground well, means for delivering water from the well to the pressure tank under pressure, an aerator including a pipe tee having a vertical passage therethrough and a horizontal passage open to the vertical passage, a water inlet pipe open from below the water line in the pressure tank to the top of the vertical aerator passageway, a turbulation flow pipe open from the bottom of the aerator vertical passage to the well and terminating above the level of the water in the well. The horizontal passage is open to the atmosphere. The pipe tee supports a mixing plug made of silver solder which is in sealing relation to the water inlet pipe and terminates in line with the horizontal pipe tee passage. The plug has at least one relatively narrow, straight line opening through it for the discharge of water from the pressure tank into the pipe tee.

16 Claims, 3 Drawing Figures

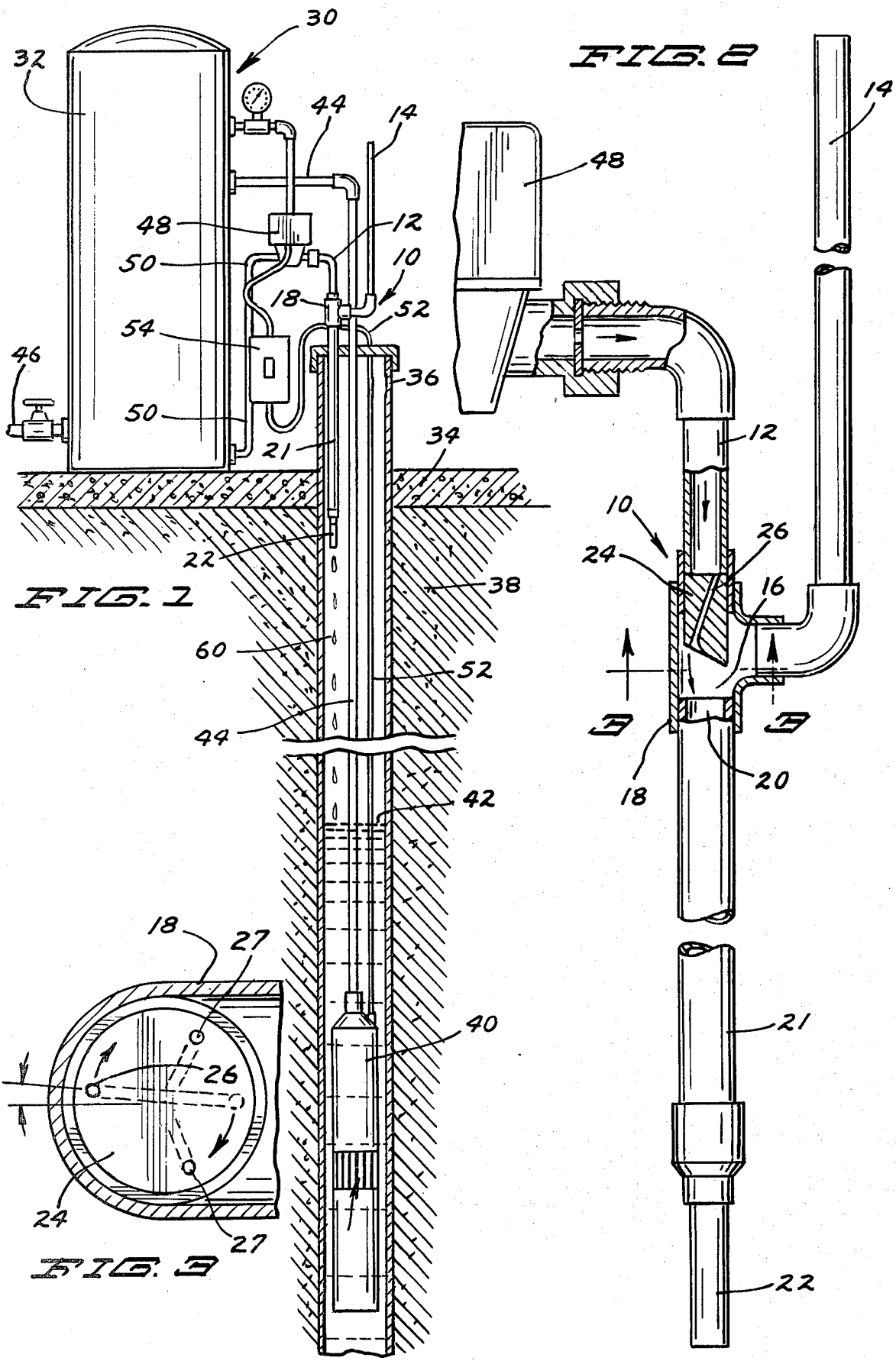

APPARATUS FOR AERATING WATER SUPPLIES

BACKGROUND OF THE INVENTION

1. Field of the Invention

This invention has relation to incorporating into a water supply sufficient air so that compounds suspended therein will be oxydized to be separated from or easily separable from the water supply in the form of gases or solids. Such apparatus will find great utility in eliminating substantially all rust and other solids and in substantially eliminating odor and taste.

2. Description of the Prior Art

The patent to Scholten, U.S. Pat. No. 3,265,370, granted Aug. 9, 1966, sets out, beginning at column 1, line 25, a full discussion of the reasons for aerating water in drinking water supply systems and other water supplies. As pointed out therein, aeration serves to remove dissolved gases such as carbon dioxide, hydrogen sulphide and methane, while at the same time oxydizing dissolved minerals such as iron and manganese and also copper and sulphur. Such precipitates can then be removed from the water supply by a simple filtration process. The present invention deals with a novel apparatus for accomplishing the aeration of the water supply, and does not deal with the subsequent filtration of the precipitated solids from that supply. This can be accomplished by any usual or preferred method, not a part of the present invention.

The Scholten patent shows a device which accomplishes aeration by cascading water from the water supply over a plurality of perforate splash trays 27 and by introducing air and forcing it up through those splash trays to bring it into contact with the water. This is typical of aeration methods known to the prior art.

The patent to Kukla, U.S. Pat. No. 4,271,099, granted in June of 1981, discloses an apparatus for mixing water and air wherein the two are introduced into a mixing chamber at right angles to each other and in which the liquid intake conduit necessarily has an intake portion and a discharge portion connected by an intermediate bend portion formed such that the intake and discharge portions are substantially in normal relation to one another. According to the disclosure of Kukla, these elements are introduced into a larger vertical exhaust discharge conduit 42 which has an interior cross-sectional area greater than any cross-sectional area along the mixing chamber where the air and water are introduced to each other.

In working with structures such as those shown in the Kukla patent, it has been found that salts of iron, sulphur and other elements and compounds precipitate out in and around the venturi and pipe bends and the like and in a short time clog the device to the point where it is no longer effective for its intended purpose. It has also been found, however, by the present inventor, that use of a very thin stream of very rapidly moving water or other liquid at the point of mixing of the liquid with air or other gas eliminates this problem.

The patent to Elkern, U.S. Pat. No. 3,920,552, granted in November of 1975, discloses an apparatus for aerating water whereby the water supply to be aerated is introduced through a horizontal row of openings around the bottom section of a vertical stand pipe, air is introduced into the vertical stand pipe above the row of water openings, and the air and water are forced upwardly together through a series of baffles designed to mix the air and the water together and are discharged through a central opening at the top of the stand pipe.

The patent to Daniel, U.S. Pat. No. 4,072,612, granted in February of 1978, shows water from a water supply being drawn along a conduit by a centrifugal pump with air being entered into the conduit at an adjustable air inlet opening to the conduit at right angles thereto. The water and air are then thoroughly mixed in the centrifugal pump and discharged by the pump back into the body of water which is to be aerated. A filter located at the inlet end of the water conduit appears to impede the flow of water flow the water supply into the conduit sufficiently to cause a pressure differential to facilitate the aspiration of the air into the conduit.

The patent to Roediger, U.S. Pat. No. 4,274,959, granted in June of 1981, discloses waste water being fed through an injector 24 into an air pressurized container 26 to draw in and dissolve the compressed air in the water by eduction. This water is then fed back out of the pressure tank into the water supply.

The patents cited above were all of the pertinent patents located in a search of the present invention. The inventor and those in privity with him are aware of no prior art which is closer than that discussed above and they are aware of no prior art which anticipates the claims herein.

SUMMARY OF THE INVENTION

A liquid such as water is mixed with a gas such as air in such proportion that the gas acts on dissolved "impurities" in the liquid to cause them to leave the solution as gases or to precipitate out so that they can be removed from the liquid by simple filtration.

In the form of the invention as shown, air is introduced into water to precipitate out copper, iron, manganese, sulphur, and other impurities and to cause still other impurities to pass off as gases.

In the form of the invention shown, a submerged pump is used inside of a well casing to lift well water into a pressure tank. Water from the pressure tank is introduced into the aerator of the invention and causes air to be drawn into a mixing chamber in the aerator where the air and water are mixed, turbulated, and after passing through a turbulation flow chamber, dropped back into the well water where the oxygen in the aerated water acts on the well water to purify it in the manner set out above.

It has been found that one-half part of oxygen per million parts of water will be effective to purify the water in such a manner. Using the apparatus of the invention, the water coming back into the pressure tank from the submerged pump has been found to have on the order of eight parts of oxygen per million parts of water.

In the form of the invention shown, the aerator includes a pipe tee positioned above the top of the well casing, having a vertical passage therethrough and a horizontal passage open to the vertical passage, thus to provide a air/water mixing chamber. A water inlet conduit opens fom the pressure tank to the top of the vertical passage through the pipe tee, and a substantially vertical turbulation flow pipe opens from the bottom of the vertical passage to position above the level of water in the well casing. There is an opening at the bottom of the turbulation flow pipe of restricted cross-sectional area to thus provide a turbulation flow chamber having a partially restricted egress port. Aerated water from this egress port flows by gravity into the top of the well casing.

A mixing plug is situated in sealing relation to the top of the vertical passage in the pipe tee and terminates in line with its horizontal passage. This plug has at least one water flow opening therethrough drilled in such a way as to encourage turbulent flow in the mixing chamber and in the turbulation chamber.

In the form of the invention as shown, this plug has a bottom end which terminates in a plane lying at an acute angle with respect to the axis of the vertical passageway, with the lowermost point of the plug terminating in line with the horizontal passageway of the pipe tee and with the uppermost point of the bottom face of the plug terminating on the side of the vertical passageway opposite the horizontal passageway. In order to encourage turbulation, the water flow opening, in the form of the invention shown, is relatively narrow and is straight, and lies in a vertical plane which is but a few degrees off of a vertical plane passing through the axis of the pipe tee horizontal passage.

Also in the form of the invention shown, a turbulent flow elimination or restriction pipe opens from the bottom of the turbulation flow chamber to increase air flow into the mixing chamber and to convert the flow of aerated water from turbulent to laminar before it discharges into the top of the well casing, well above the water table in that casing.

BRIEF DESCRIPTION OF THE DRAWINGS

FIG. 1 is an elevational view of a complete well and home water supply system with the well casing shown in transverse cross section;

FIG. 2 is an elevational view of the aerator of the invention forming a part of the apparatus of FIG. 1, with parts in section and parts broken away; and FIG. 3 is an enlarged horizontal sectional view taken on the line 3—3 in FIG. 2; but showing multiple water flow openings through a mixing plug.

DETAILED DESCRIPTION OF THE PREFERRED EMBODIMENTS

An aerator 10 includes an aerator water inlet pipe 12 for receiving water under pressure; an aerator air inlet pipe 14 open to the atmosphere; an air/water mixing chamber 16 constituted, in the form of the invention shown, as being in the interior of a pipe tee 18; a turbulation flow pipe 21 providing a turbulation flow chamber 20 open to the bottom of the mixing chamber 16 and extending downwardly from the bottom of the pipe tee 18; and a turbulent flow elimination or restriction pipe 22 open to and extending downwardly from the bottom of the turbulation flow pipe 21.

As seen in FIG. 2, the aerator water inlet pipe 12 opens to the top of a vertical passage through the pipe tee 18, while the turbulation flow pipe 21 opens from the bottom of that passage. The aerator air inlet pipe 14 is open through a horizontal passage of the pipe tee 18. A mixing plug 24 is permanently mounted in the pipe tee in sealing relationship to the water inlet pipe 12, but, as shown, a narrow, straight water flow opening 26 is drilled through it to allow passage of water from water inlet pipe 12 to the air/water mixing chamber 16.

In a preferred embodiment of the invention, this mixing plug 24 is made of silver solder and a vertical plane including the water flow opening 26 lies at an angle of approximately 5° with a vertical plane which includes the axis of the pipe tee horizontal passage. It has been found that excellent results can be obtained where the axis of the water flow opening lies at between 32° and 37° with the vertical.

In the form of the invention shown, a bottom plane face of the plug 24 forms a 45° angle with the horizontal, with the lowermost point of the plug being situated adjacent the horizontal pipe tee passage and directly in alignment with a vertical radial line passing through the axis of the horizontal passage of the pipe tee 18. The water flow opening 26 passes through the plug 24 so that the egress of that opening is situated in adjacent relationship to the highest point on the bottom face of the plug 24 while its ingress is situated in adjacent relationship to a point on the circumference of the vertical passage which is closest to the horizontal passage.

It has been found that the operation of the aerator of the invention can be very greatly enhanced by constituting the mixing plug 24 of silver solder. It is believed that this causes an ionization to take place which appears to very substantially enhance the action of the aerated water when it arrives in the well water.

It has also been found that the relatively small diameter of the straight water flow opening 26 through the mixing plug 24 results in a flow rate which is sufficiently rapid so that the opening 26 is self-cleaning. This high flow rate increases the tendency for abrasion of the sides of the plug defining the water flow opening, so material such as plastic and such as silver solder will work well as far as this feature is concerned. However, because of the action of silver solder and materials like silver solder in substantially enhancing the effectiveness of the process, silver solder, is, at this time, the preferred material for the mixing plug.

Furthermore, by constituting the bottom face of the mixing plug at a 45° angle with respect to the axis of the vertical passage through the pipe tee, with the lowermost point of that face most nearly adjacent the point where the horizontal passage joins with the vertical passage, and with the water flow opening in the form of a relatively narrow, straight, cylindrical conduit having an axis lying in a vertical plane forming a 5° angle with a vertical plane which includes the axes of the horizontal and vertical passages through the pipe tee, the aerating action is further enhanced. This is believed to be due to an increase in turbulence generated in the mixing chamber 16 and in the turbulation flow chamber 20. This structure also seems to increase the amount of air drawn through the horizontal passageway over any other single water flow opening mixing plug design which was tested.

It has been found, however, that the amount of water flowing through the mixing plug 24 and the amount of air entering the aerator 10 through the air inlet pipe 14 can be substantially increased by providing more than one water flow opening 26. The discharge ports and the inlet ports of these openings can be distributed around the mixing plug 24, and the angular relationship of these openings and of the direction of these openings through the mixing plug with respect to a central vertical axis of the mixing plug, for example, can be identical with that of the aforementioned single water flow opening 26. In FIG. 3, two additional water flow openings 27,27 are illustrated, but two or more than three openings would also serve to enhance operation of the apparatus. While doubling or tripling the number of openings does not increase the water flow through the aerator by directly doubling or tripling it, still in an apparatus which delivers 2½ gallons per minute at 40 pounds per square inch of pressure with a single water flow opening, a flow of 5½ gallons per minute can be achieved with three such water flow openings at a pressure of 40 pounds per square inch. In this example, the diameter of all water flow openings was ⅛" (3.175 mm).

Increase in the flow of water through the aerator 10 causes an increase in the flow of air to the aerator through aerator air inlet pipe 14. Because this air is being carried into the water supply, it will be important, in many situations, to provide a filter in air inlet pipe 14 to insure that no deleterious substances are carried into the water supply. A filter of any usual or preferred construction can be used for this purpose.

Should it be considered desirable or should it be required that the apparatus of the invention include a means for chlorinating the water supply, this can be accomplished by having the air entering through inlet pipe 14 pass through a bath of hydrochloric acid, thus causing the air to entrain a certain amount of chlorine and to carry it through the pipe 14 and into the horizontal opening in the aerator pipe tee 18.

The turbulation flow pipe 21 with its restricted cross sectional area at the bottom thereof is effective to draw sufficient air through the aerator inlet pipe to cause effective aeration for the purpose of the invention. However, with the addition of the turbulation flow elimination or restriction pipe 22 at the bottom of turbulation flow pipe 21, the flow through pipe 22, at least at the bottom end of the pipe, appears to be laminar, and the vacuum at the top of air inlet pipe 14 is greatly increased, thus, of course, causing a commensurate increase in the amount of air being drawn into the mixing chamber 16.

Using all these elements or only some of these elements, a body of water in a well casing can be successfully aerated to the point where sufficient oxygen is present to purify the water from substantially all dissolved solids, and to substantially eliminate rust, odor and taste. For example, effective results can still be obtained when the plug is not made from silver solder, when the water flow opening is skewed more or less than 5° from the defined vertical plane, and/or when the turbulent flow restriction pipe is eliminated. Much more effective results can be obtained, however, if all or most of these elements are present.

Such a device with or without some or all of the above innumerated elements can be positioned above a body of water such as a more or less stagnant lake or pond, sewage sump, home swimming pool, or the like. Water at say 40 pounds per square inch pressure can be introduced into the water inlet pipe 12 by a small pump drawing from the body of water to be aerated, air will be drawn through air inlet pipe 14 into the mixing chamber 16; and the water discharging from the lower end of the aerator back into the body of water being aerated will contain sufficient oxygen to accomplish the desired results. The amount of oxygen will depend on which and how many of the above innumerated elements of the aerator have been used or eliminated.

The apparatus for aerating water supplies including aerator 10 will now be described in connection with a more or less conventional cased well and home water system 30. This system 30 can include a pressure tank 32 resting on a basement floor 34; a well casement 36 driven into the earth 38; a submerged well pump 40 located beneath the top of the water table 42; a well water supply pipe 44 for delivering the well water from the pump 40 to an upper portion of the pressure tank 32; an aerated well water outlet pipe and valve 46 for delivering the pressurized well water from the pressure tank 32 to locations for use in the home; a solenoid and valve 48 responsive to pressure within the pressure tank 32 for activating the submerged pump 40 and simultaneously opening aerator water inlet pipe 12 to water under pressure from a bottom portion of the pressure tank 32 through the instrumentality of an aerator water supply pipe 50. The solenoid 48 also activates the submerged well pump 40 through the instrumentality of electrical cable 52 through an electrical junction box 54.

When the pressure activated solenoid 48 activates pump 40 and introduces water under pressure to the aerator water inlet pipe 12, the resulting aerated water falls from the aerator and down the well casing as indicated at 60. The oxygen in this water diffuses throughout the water standing in the well casement 36 and has the described effects.

Operation of the aerator only when the well pump operates has been found to give the desired results; but in other situations (aerating stagnant lakes, for example) the aerator can be operated continuously.

The size and proportioning of the parts can be varied to meet the situation. In a typical installation, however, the turbulation flow chamber 20 can be 30 inches (76 cm) long; the turbulent flow elimination or restriction pipe 22 can be 4 inches (10 cm) long, the diameter of the water flow opening 26 can be ⅛" (3.175 mm), and the home water system can be set to begin pumping well water when the pressure drops to 30 pounds per square inch and to quit pumping at 50 punds per square inch.

The size or number of the water flow openings determines the amount of delivery of water for example in gallons per minute. Water flow openings have been developed with various sized conduits, for example, to deliver 2½ gallons per minute at 40 pounds pressure; 4½ gallons per minute at 40 pounds pressure; 6½ gallons per minute at 40 pounds pressure; and for municipal wells, up to 20 gallons per minute at 40 pounds per square inch of pressure.

Although the present invention has been described with reference to preferred embodiments, workers skilled in the art will recognize that changes may be made in form and detail without departing from the spirit and scope of the invention.

What is claimed is:

1. An apparatus for aerating water from an underground well having a ground water level therein below the surface of the ground, said apparatus including:
   a. a pressure tank situated above the water level in the underground well;
   b. a well water supply pipe leading from below the surface of the water in the well to the interior of the pressure tank;
   c. pump means for delivering water from the well through the supply pipe to the pressure tank under pressure;
   d. an aerator having an air inlet port, a water inlet port and an air/water discharge port, said air inlet port being open to the atmosphere;
   e. conduit means open from a below-water portion of the pressure tank to the aerator water inlet port;
   f. a turbulation flow pipe open between the air/water discharge port and the ground well above the level of water in the ground well; and
   g. said aerator having a mixing chamber open to said air and water inlet ports and to said air/water discharge port, said aerator including means to draw air into said air inlet port, to mix the air with the water entering the water inlet port, and to discharge this air/water mixture in a turbulent flow state out of said air/water discharge port, all responsive to the flow of water under pressure into the water inlet port.

2. An apparatus for aerating a water supply including:
a. a source of water under pressure;
b. a pipe tee having a vertical passage therethrough and a horizontal passage open to the vertical passage to thus provide an air/water mixing chamber;
c. a water inlet conduit open between the source of water under pressure and the top of the vertical passage through the pipe tee;
d. the horizontal passage in the pipe tee being open to the atmosphere;
e. a substantially vertical turbulation flow pipe open to the bottom of the vertical passage through the pipe tee and having a bottom opening of restricted cross sectional area to thus provide a turbulation flow chamber having a partially restricted egress;
f. means for drawing said air into said mixing chamber responsive to the flow of water therethrough, said means including a mixing plug in sealing relation to the top end of the vertical passage of the pipe tee and terminating in line with its horizontal passage and said plug having a water flow opening therethrough;
g. wherein said water flow opening is relatively narrow and lies in a straight line through the mixing plug;
h. wherein the straight line water flow opening lies in a plane which forms an acute angle with the plane including the axes of the horizontal and vertical passages through the pipe tee;
i. wherein the water flow opening extends through the mixing plug from the top of the plug at a side of the vertical passage adjacent the horizontal passage to the bottom of the plug at a position spaced from the horizontal passage; and
j. wherein a bottom face of the mixing plug lies in a plane which forms an acute angle with respect to the axis of the vertical passage through the pipe tee with the lowermost portion of that face in alignment with and adjacent to the area of entry of the horizontal passage into the vertical passage and with its uppermost portion diammetrically opposite thereto.

3. The apparatus of claim 2 wherein:
h. there is more than one water flow opening through the mixing plug and each opening is in skewed relation to all others.

4. The apparatus of claim 3 wherein:
i. each water flow opening is symmetrical with all other water flow openings about the center axis of the vertical aerator passage.

5. The apparatus of claim 2 wherein:
k. the bottom face of the mixing plug lies at an angle of approximately 45° with respect to the axis of the vertical pipe tee passage.

6. The apparatus of claim 2 wherein:
k. the mixing plug is made of silver solder.

7. The apparatus of claim 2 wherein:
k. the water flow opening is cylindrical in cross section and the port formed by the entry of the water flow opening through the bottom face of the mixing plug is rounded and relieved in direction toward the horizontal passage.

8. An apparatus for aerating water from a ground well including:
a. a pressure tank situated above the water in a ground well;
b. a well water supply pipe leading from below the water in the well to the interior of the pressure tank;
c. pump means for delivering water from the well through the supply pipe to the pressure tank under pressure;
d. an aerator having an air inlet port, a water inlet port and an air/water discharge port, said air inlet port being open to the atmosphere;
e. conduit means open from a below-water portion of the pressure tank to the aerator water inlet port;
f. a turbulation flow pipe open between the air/water discharge port and the ground well above the level of water in the ground well;
g. said aerator having a mixing chamber open to said air and water inlet ports and to said air/water discharge port, said aerator including means to draw air into said air inlet port, to mix the air with the water entering the water inlet port, and to discharge this air/water mixture in a turbulent state out of said air/water inlet port, all responsive to the flow of water under pressure into the water inlet port;
h. wherein said aerator includes a pipe tee having a vertical passage therethrough, the top of said vertical passage forming the water inlet port, the bottom of said vertical passage forming the air/water discharge port, said aerator also including a horizontal passage open to the vertical passage, said horizontal passage providing the air inlet port, the intersection of said horizontal and vertical passages providing an air/water mixing chamber;
i. wherein said turbulation flow pipe is cylindrical and substantially vertical to define a cylindrical turbulation flow chamber, said flow pipe having a bottom opening of lesser cross sectional area than that of the cylindrical chamber; and
j. wherein said means for drawing air into the aerator includes a mixing plug in sealing relation to the water inlet port and terminating in line with the horizontal passageway, said plug having a water flow opening therethrough.

9. The apparatus of claim 8 wherein:
k. said plug is made of a substance which has the effect of silver solder on water and on an air and water mixture.

10. The apparatus of claim 8 wherein:
k. said mixing plug is made of silver solder.

11. The apparatus of claim 8 wherein:
k. said water flow opening is relatively narrow and lies in a straight line through the mixing plug.

12. The apparatus of claim 11 wherein:
l. the straight line water flow opening lies in a plane which forms an acute angle with a plane including the axes of the horizontal and vertical passages through the pipe tee; and
m. the water flow opening extends through the mixing plug from the top of the plug at a side of the vertical passage adjacent the horizontal passage to the bottom of the plug at a position spaced from the horizontal passage.

13. The apparatus of claim 12 wherein:
n. a bottom face of the mixing plug lies in a plane which forms an acute angle with respect to the axis of the vertical passage through the pipe tee with the lowermost portion of that face in alignment with and adjacent to the area of entry of the horizontal passage into the vertical passage and with it uppermost portion diametrically opposite thereto.

14. The apparatus of claim 13 wherein:
o. the bottom face of the mixing plug lies at an angle of approximately 45° with respect to the axis of the vertical pipe tee passage.

15. The apparatus of claim 13 wherein:
o. the mixing plug is made of silver solder.

16. The apparatus of claim 13 wherein:
o. the water flow opening is cylindrical in cross section and the port formed by the entry of the water flow opening through the bottom face of the mixing plug is rounded and relieved in direction toward the horizontal passage.

* * * * *